(12) United States Patent
Kelly (10) Patent No.: US 10,158,284 B2
(45) Date of Patent: Dec. 18, 2018

(54) PFC WITH STACKED HALF-BRIDGES ON DC SIDE OF RECTIFIER

(71) Applicant: TRIDONIC GMBH & CO KG, Dornbirn (AT)

(72) Inventor: Jamie Kelly, North Shields (GB)

(73) Assignee: TRIDONIC GMBH & CO KG, Dornbirn (AT)

( * ) Notice: Subject to any disclaimer, the term of this patent is extended or adjusted under 35 U.S.C. 154(b) by 4 days.

(21) Appl. No.: 15/556,777

(22) PCT Filed: Mar. 16, 2016

(86) PCT No.: PCT/AT2016/050061
§ 371 (c)(1),
(2) Date: Sep. 8, 2017

(87) PCT Pub. No.: WO2016/154648
PCT Pub. Date: Oct. 6, 2016

(65) Prior Publication Data
US 2018/0062503 A1   Mar. 1, 2018

(30) Foreign Application Priority Data

Mar. 27, 2015 (GB) .................................. 1505621.1

(51) Int. Cl.
*H02M 1/42* (2007.01)
*H02M 3/335* (2006.01)
*H02M 1/00* (2006.01)

(52) U.S. Cl.
CPC ............. *H02M 1/425* (2013.01); *H02M 1/42* (2013.01); *H02M 1/4258* (2013.01);
(Continued)

(58) Field of Classification Search
CPC ...................................................... H02M 7/538
See application file for complete search history.

(56) References Cited

U.S. PATENT DOCUMENTS 6,841,950 B1    1/2005  Walker
9,413,221 B1 *  8/2016  Kim ....................... H02M 1/32
(Continued)

FOREIGN PATENT DOCUMENTS

DE       10204433    7/2003
EP        2225918    10/2013
(Continued)

OTHER PUBLICATIONS

International Search Report and Written Opinion in parent application PCT/AT2016/050061 dated Jul. 31, 2016.
(Continued)

*Primary Examiner* — Jue Zhang
*Assistant Examiner* — Trinh Q Dang
(74) *Attorney, Agent, or Firm* — Andrus Intellectual Property Law (57) ABSTRACT

The invention relates to an operating device (1) for lighting means (8), having a circuit (101) for dividing a rectified alternating voltage to direct voltages of lower levels, wherein the circuit (101) comprises a PFC block comprising a plurality of half bridge converters (102, 103, 104) that are arranged such that the sum of the input voltage drops across the half bridge converters (102, 103, 104) corresponds to the value of the rectified alternating voltage, wherein the circuit (101) is the first active stage in a power supply for the lighting means (8).

8 Claims, 8 Drawing Sheets (52) U.S. Cl.
CPC .......... *H02M 3/33507* (2013.01); *H02M 2001/0074* (2013.01); *Y02B 70/126* (2013.01)

(56) References Cited

U.S. PATENT DOCUMENTS

| | | | |
|---|---|---|---|
| 2006/0049813 | A1 | 3/2006 | Hendrix |
| 2007/0086224 | A1* | 4/2007 | Phadke ............... H02M 3/285 363/65 |
| 2008/0084167 | A1 | 4/2008 | Waffenschmidt et al. |
| 2014/0153294 | A1 | 6/2014 | Deboy et al. |
| 2014/0346962 | A1* | 11/2014 | Sanders ............ H05B 33/0815 315/193 |
| 2016/0072312 | A1 | 3/2016 | Ichikawa et al. |

FOREIGN PATENT DOCUMENTS

| | | |
|---|---|---|
| GB | 2470959 | 12/2010 |
| GB | 2475518 | 5/2011 |
| WO | 20150005155 | 2/2017 |

OTHER PUBLICATIONS

Search Report in pending priority UK patent application GB1505621.1 dated Sep. 22, 2015.

Chien et al, Series Resonant Converter with Series-Parallel Transformers for High Input Voltage Applications, Tencon 2011—2011 IEEE Region 10 Conference, Nov. 21, 2011, pp. 873-877.

Wu et al, A PDM Controlled Series Resonant Multi-level Converter Applied for X-ray Generators, Power Electronics Specialists Conference, 1999, PESC 99, 30th Annual I EEE Charleston, SC, USA, Jun. 27-Jul. 1, 1999, pp. 1177-1182.

\* cited by examiner

PFC WITH STACKED HALF-BRIDGES ON DC SIDE OF RECTIFIER

CROSS REFERENCE TO RELATED APPLICATIONS

The present application is the U.S. national stage application of International Application PCT/AT2016/050061, filed Mar. 16, 2016, which international application was published on Oct. 6, 2016 as International Publication WO 2016/154648 A1. The International Application claims priority to Great Britain Patent Application 1505621.1 filed Mar. 27, 2015.

FIELD OF THE INVENTION

The present invention is in the area of actively switched PFCs (power factor correction circuits) for operating devices for lighting means. Especially, the present invention relates to an operating device for lighting means which can operate at very high frequencies and can be provided with a relatively high voltage (mains voltage). The invention also relates to a lighting device including such an operating device

BACKGROUND OF THE INVENTION

Low profile converters are a particular area of interest in connection with LED lighting. Planar transformers and high frequency operation are associated with this.

Previous reports have highlighted the problems of operating a converter at high frequencies with an associated high voltage.

The German patent application DE 102 04 433 A1 teaches a direct voltage converter such as an electronic power supply unit for gas discharge lamps that is supplied with a rectified mains voltage and produces a converted controlled direct voltage. The direct voltage converter comprises a high frequency power inverter and a series resonant circuit, wherein the high frequency power inverter applies to the series resonant circuit a high frequency alternating voltage. The high frequency of the high frequency power inverter is within the range of the resonant frequency of the series resonant circuit. Further, an output rectifier produces a controlled rectified output voltage, wherein the control of the output voltage is performed by feeding the output voltage back to a control unit that controls the switches of the high frequency power inverter.

The European patent document EP 2 225 918 B1 discloses a circuit for an electrically isolated generation of an output voltage starting from a mains voltage, wherein the circuit comprises a power factor correction circuit with an inductor, which is supplied with the mains voltage, and with a controllable switch for controlling the charging and discharging of the inductor. Furthermore, the circuit comprises at least one potential separation transformer for galvanic isolation of the output voltage from the mains voltage, wherein at the time of discharging the inductor a first part of the energy stored by the inductor during the charging is directly supplied to the potential separation transformer.

In the light of the prior art, it is an object of the present invention to provide an improved operation device for lighting means that can achieve PFC functionality when operated at high frequency and high voltages.

This object is achieved by an operation device and a lighting device according to the invention described below.

SUMMARY OF THE INVENTION

Generally, the invention relates to a PFC topology, preferably an offline PFC topology, which means that the PFC functionality is achieved using a switched converter. In an embodiment of the invention the switching according to the invention is controlled by a (integrated) control circuitry which may be supplied with feedback signals.

In detail, the operating device of the present invention is an operating device for lighting means, having a circuit for dividing a rectified alternating voltage to direct voltages of lower levels, wherein the circuit comprises a PFC block comprising a plurality of half bridge converters that are arranged such that the sum of the input voltage drops across the half bridge converters corresponds to the value of the rectified alternating voltage, wherein the circuit is the first active stage in a power supply for the lighting means. Preferably, the PFC block may be an offline PFC block.

The advantage of such an implementation is that a high input voltage being a rectified alternating voltage can be divided to voltages of lower levels that are more suited for high frequency switching. Therefore, electronic elements with smaller dimensions can be used in the circuit and, thus, switching can be performed at higher frequencies and the profile of the operating device can be lower.

According to another aspect of the invention, each half bridge converter comprises a capacitor that is connected in parallel to the half bridge of the corresponding half bridge converter.

The capacitor is provided as a storage element for smoothing the rectified alternating input voltage. This provides the advantage of high frequency decoupling when switching the half bridge.

According to a further aspect of the invention, the circuit for dividing the rectified alternating voltage to direct voltages of lower levels is a first circuit and the operating device further comprises a second circuit being supplied by the output of the first circuit for rectifying the output voltage of each half bridge converter.

Since the first circuit divides the input voltage to voltages of lower levels the second circuit has to deal with input voltages that are smaller than the input voltage of the first circuit. Therefore, the electronic elements of the second circuit can have smaller dimensions.

This is advantageous, as the profile of the second circuit can be decreased and the manufacturing costs can be improved.

According to another aspect of the invention, the operating device comprises a plurality of resonant circuits, wherein each half bridge converter of the first circuit is connected via one of the plurality of resonant circuits to the second circuit.

As a result, when switching the half bridge converters at a frequency that is within the range of the resonant frequency of the resonant circuits a detection of the power factor (PF) is dispensable. Namely, in resonance the reactances of the inductivities and capacities of a resonant circuit cancel each other out. Thus, in resonance a resonant circuit represents a quasi-ohmic load.

According to a further aspect of the invention, the operating device further comprises a plurality of transformers for galvanically isolating the first circuit from the second circuit.

This implementation has the advantage that the output voltage of the second circuit is galvanically isolated from the input voltage of the first circuit. Furthermore, the transformers can be used for setting or converting the input voltages of the second circuit by changing the turns ratio of the respective transformer.

According to another aspect of the invention, each of the half bride converters is operated with a frequency laying within 50%, preferably 20%, even more preferred 10% of the resonance frequency of the corresponding resonant circuit.

The operation of the half-bridge converters is controlled by a control circuitry, which may be e.g. a microcontroller, an ASIC etc.

This has the advantage that no detection of the power factor (PF) is needed, as the resonant circuit represents in resonance a quasi-ohmic load.

According to a further aspect of the invention, each of the half bridge converters is operated with a fixed frequency.

As a result, the control of the half bridge converters is simplified. Namely, once the frequency is set to the predetermined value, no further setting of the frequency is required.

According to another aspect of the invention, each of the half bridge converters is operated with the same frequency.

This has the advantage, that the control of the half bridge converters is further simplified, as only one frequency value needs to be set, which is then applied to all of the half bridge converters.

According to a further aspect of the invention, a lighting device is proposed that comprises an operating device according to the present invention and lighting means, wherein the lighting means are supplied by the operating device with energy.

According to another aspect of the invention, a PFC block for an operating device for lighting means comprising a plurality of half bridge converters that are arranged such that the sum of the input voltage drops across the half bridge converters corresponds to the value of the rectified alternating voltage is proposed. Preferably the PFC block is an offline PFC block.

BRIEF DESCRIPTION OF THE DRAWINGS

For a better understanding of the present invention, embodiments will now be described by way of example, with reference to the accompanying drawings, in which.

DETAILED DESCRIPTION

The first embodiment of the invention discloses an operating device 1 for lighting means 8 comprising a circuit 101 (first circuit) for dividing a rectified alternating voltage to direct voltages of lower levels, i.e. to direct voltages each of lower level. This circuit 101 can be the first active stage in a power supply for lighting means 8 and is shown in FIG. 1.

In detail, the circuit 101 comprises a plurality of half bridge converters 102, 103 and 104 that are arranged in a chain, i.e. the circuit 101 is a cascaded circuit of three half bridge converters. For describing the features of each half bridge converter the half bridge converter 102 is exemplarily described. The half bridge converter 102 is composed of a capacitor C1 and two switches Q1 and Q2. The two switches Q1 and Q2 are connected in series and the capacitor C1 is connected in parallel to the switches Q1 and Q2. The two switches Q1 and Q2 can be transistors such as MOSFET transistors. The capacitor C1 is arranged at the input side of the half bridge converter 102 and the two switches Q1 and Q2 connected in series are arranged at the output side of the half bridge converter 102. The output voltage of the half bridge converter 102 is provided at the connection point of the two switches Q1 and Q2. Thus, the two switches Q1 and Q2 form a half bridge. The input sides of the half bridge converters 102, 103 and 104 being arranged in a chain form the input side of the circuit 101.

Figure 1:
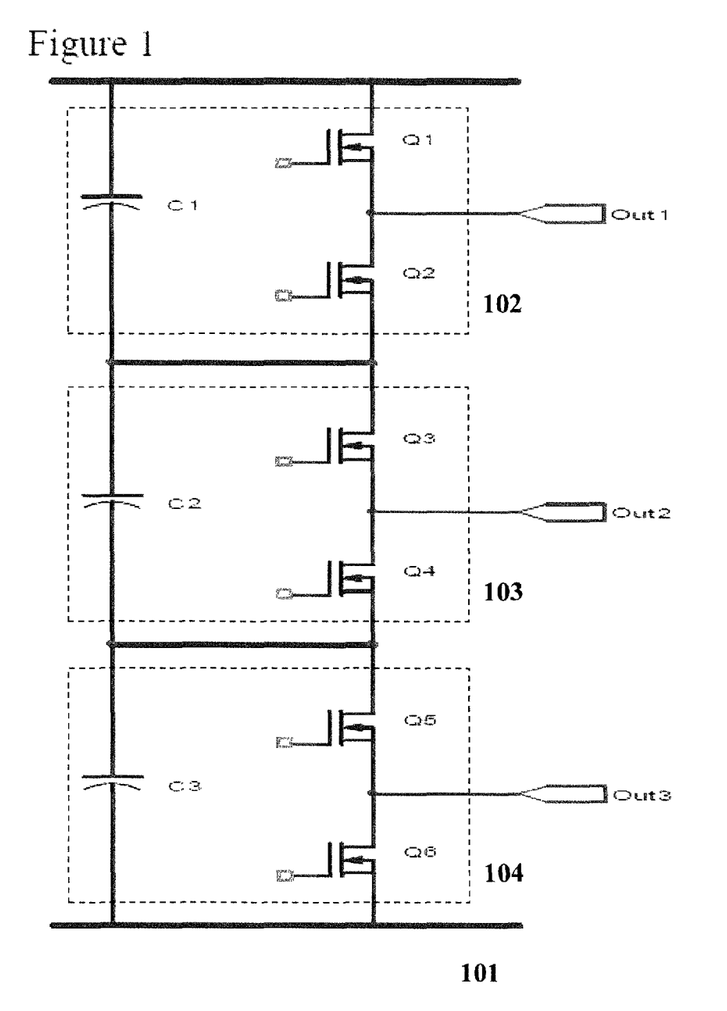
FIG. 1 shows a circuit for dividing a rectified alternating voltage to direct voltages of lower levels being comprised by an operating device according to a first embodiment of the invention.

In FIG. 1 the chain of half bridge converters comprises three half bridge converters. However, according to the present invention the number of half bridge converters is not limited to three converters. Therefore, only two half bridge converters or a larger number of half bridge converters may be provided. That is, the chain of half bridge converters comprises at least two half bridge converters.

The half bridge converters of the chain of half bridge converters are controlled by a control circuitry i.e. a control. Preferably, the half bridge converters may be independently controlled by separate controllers, wherein the frequencies for operating the half bridge converters are expected to be different. The half bridge converters may also be operated with a fixed frequency or with a frequency that lays within 50%, preferably 20%, even more preferred 10% of the resonance frequency of the corresponding resonant circuit. In the case the resonant circuits are dimensioned equally, the half bridge converters may be operated with the same frequency respectively with similar frequencies, as the practical circuit tolerances would prevent the resonant circuits from being the same.

A rectified alternating voltage can be applied as an input voltage to the input side of the circuit 101. This rectified alternating voltage typically corresponds to a high voltage, such as mains voltage, that has been rectified by a rectifier 3. When a rectified alternating voltage ($V_{IN,101}$) is applied to the circuit 101, the sum of the voltage drops (input voltage drops/$V_{IN,102}$, $V_{IN,103}$ and $V_{IN,104}$) across the input sides of the half bridge converters 102, 103 and 104 corresponds to the value of the smoothed rectified alternating voltage ($V_{IN,101}=V_{IN,102}+V_{IN,103}+V_{IN,104}$). The value of the voltage drop across the input side of a half bridge converter depends on the dimensioning of that half bridge converter. Generally, the half bridge converters 102, 103 and 104 can be differently dimensioned.

However, in the following we assume that the half bridge converters 102, 103 and 104 are equally dimensioned. In this case, the value of the voltage drop (input voltage drop) across the input side of each half bridge converter 102, 103, 104 corresponds to the value of the smoothed rectified alternating voltage divided by the total number of half bridge converters.

Each half bridge converter of the circuit 101 represents a power inverter. Namely, the output voltage of each half bridge converter alternates between two direct voltages as a result of switching the two switches. The difference between these two output voltages corresponds to the input voltage drop across the capacitor of the half bridge converter. Thus, when circuit 101 has three half bridge converters, this voltage difference corresponds to only one third of the input voltage of circuit 101.

The circuit 101 of the operating device according to the first embodiment has the advantage that a high input voltage can be divided to voltages of lower levels, i.e. to voltages each of lower level, which are more appropriate or suited for high frequency switching. Namely, in the case that the circuit 101 comprises three half bridge converters, as shown in FIG. 1, the difference between the two output voltages of a half bridge converter is only one third of the input voltage of circuit 101. Therefore, electronic elements of smaller dimension can be used and, thus, the profile of the circuit 101 can be reduced. Thus, the operating device of the first embodiment being supplied with a high input voltage can be operated at high frequencies.

Figure 2:
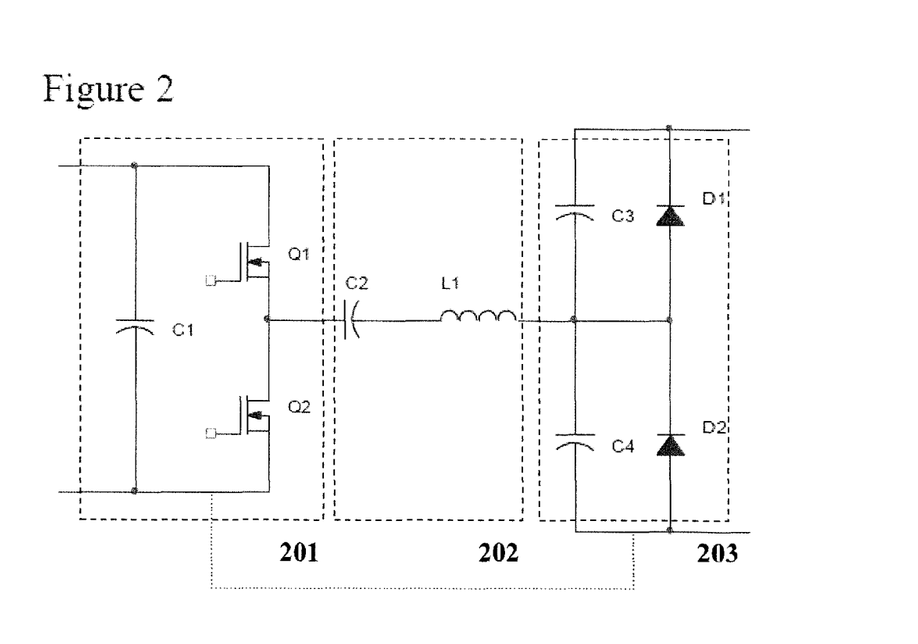
FIG. 2 shows a half bridge converter being connected to another circuit by a resonant circuit.

FIG. 2 shows a half bridge converter 201 being connected to a circuit 203 via a capacitor C2 and an inductor L1 being connected in series. The circuit 203 consists of two capacitors C3 and C4 connected in series and two diodes D1 and D2 connected in series. The capacitors C3 and C4 and the diodes D1 and D2 are connected in parallel. The capacitor C2 and inductor L1 (indicated in FIG. 2 with the reference sign 202) connect the output of the half bridge converter 201, i.e. the connection point between the switches Q1 and Q2, to the connection point between the capacitors C3 and C4 and to the connection point between the diodes D1 and D2 of the circuit 203. That is, the capacitors C3 and C4 are connected to the inductor L1, wherein the inductor L1 and the capacitors C3 and C4 form a parallel resonant circuit. Alternatively, the capacitor C2 and inductor L1 may form a series resonant circuit.

The frequency of the half bridge converter 201 for switching the switches Q1 and Q2 is within 50%, preferably 20%, even more preferred 10% of the resonant frequency of the resonant circuit. Namely, in resonance the reactances of the inductivities and capacities of the resonant circuit cancel each other out. Thus, in resonance the resonant circuit represents a quasi-ohmic load.

The advantage of the resonant circuit is that the power factor (PF) does not need to be detected, because as already mentioned the resonant circuit represents in resonance an inherent ohmic load.

Figure 3:
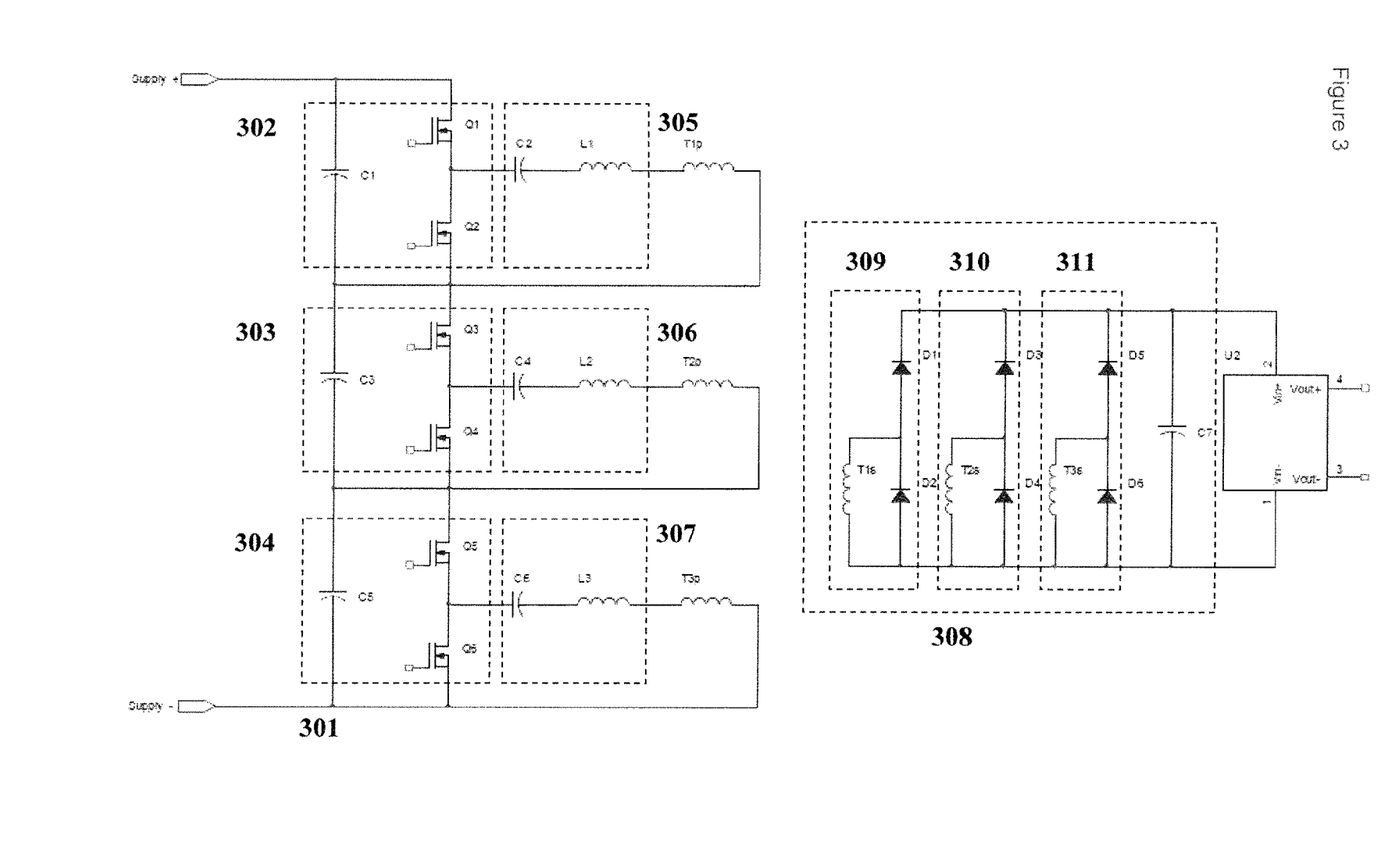
FIG. 3 shows an operating device for lighting means according to a second embodiment of the invention.

FIG. 3 shows an operating device 1 for lighting means 8 according to a second embodiment of the invention. This operating device 1 comprises a circuit 301 that corresponds to the circuit 101 as shown in FIG. 1 of the first embodiment and, thus, a detail description thereof is omitted.

The output of each half bridge converter 302, 303 and 304 of the circuit 301 is electrically coupled to a second circuit 308 via series resonant circuits 305, 306 and 307 and transformers T1, T2 and T3, respectively. Each series resonant circuit consists of a capacitor C and an inductor L being connected in series. Each transformer has a primary side Tp and a secondary side Ts.

As already mentioned the circuit 301 is the first active stage in a power supply for lighting means and, thus, is also referred to as first circuit 301. The second circuit 308 functions as a rectifier and energy storage.

The second circuit 308 is composed of three sub-circuits 309, 310 and 311 that are connected in parallel to a capacitor C7. The sub-circuits 309, 310 and 311 are rectifiers for rectifying the output voltages of the half bridge converters 302, 303 and 304 of the first circuit 301 and the capacitor C7 is an energy storage. The number of sub-circuits corresponds to the number of half bridge converters in the first circuit 301. The features of a sub-circuit are exemplarily described with respect to sub-circuit 309.

The sub-circuit 309 comprises two diodes D1 and D2 that are connected in series. The inductor T1$s$ of the secondary side of the transformer T1 is connected in parallel to diode D2 and, thus, the sub-circuit 309 is electrically coupled to the half bridge converter 302. The alternating output voltage of the half bridge converter 302 (due to the switching of the switches Q1 and Q2) is supplied via the resonant circuit 305 and the transformer T1 to the sub-circuit 309.

The frequency for switching the switches of each half bridge converter lays within 50%, preferably 20%, even more preferred 10% of the resonant frequency of the corresponding series resonant circuit. Namely, this has the advantage that the power factor (PF) does not need to be detected, because (as already mentioned with respect to FIG. 2) a resonant circuit represents in resonance an inherent ohmic load. Preferably, the series resonant circuits 305, 306 and 307 are equally dimensioned, so that the switching frequency is the same for each half bridge converter. As a result only one frequency needs to be generated.

The alternating output voltages of the half bridge converters are rectified by the sub-circuits 309, 310 and 311 and the capacitor C7 is charged with energy.

In detail, taking the half bridge converter 302 and the corresponding sub-circuit 309 as an example, with the switching of the switches Q1 and Q2 and the filtering by the resonant circuit 305 the diode D2 can be controlled in such a way that the capacitor C7 is charged with the energy being transmitted from the primary side T1$p$ to the secondary side T1$s$ of the transformer T1.

The operating device according to the second embodiment has several advantages. Firstly, the voltage that drives a next stage converter U2 can be set to a preferred voltage level by adjusting the turns ratios of the transformers T1, T2 and T3. Secondly, a galvanic isolation is provided by the transformers T1, T2 and T3 between the first circuit 301 (circuit 301) and the second circuit 308. Thirdly, the switches of the half bridge converters 302, 303 and 304 can be operated with the same frequency, when equally dimensioning the resonant circuits 305, 306 and 307. Fourthly, the topology of FIG. 3 has the advantage of a negligible surge current when switching the switches of the half bridge converters 302, 303 and 304, as only high frequency decoupling capacitors C1, C3 and C5 are charged.

Figure 4:
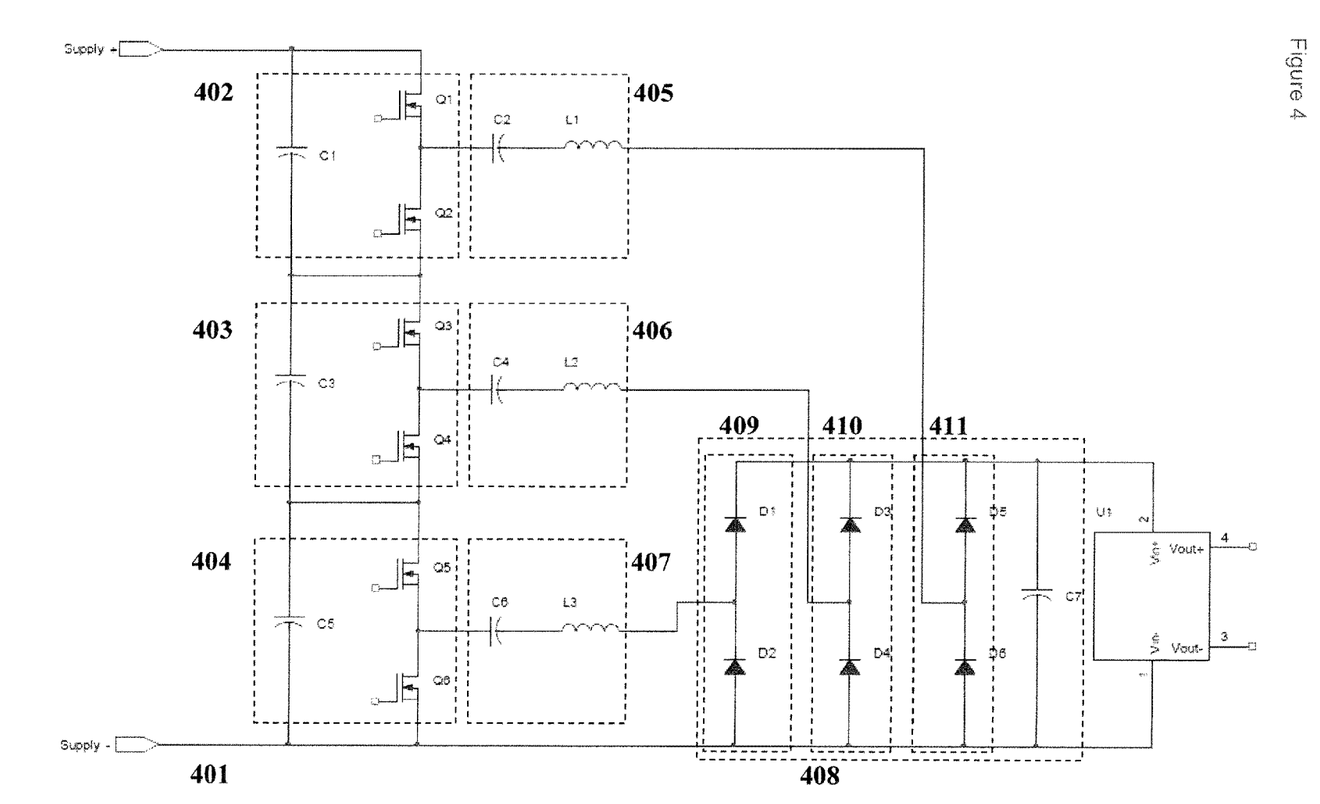
FIG. 4 shows an operating device for lighting means according to a third embodiment of the invention.

FIG. 4 shows an operating device 1 for lighting means 8 according to a third embodiment of the invention. This operating device 1 differs from the operating device 1 according to the second embodiment, in that the transformers T1, T2, T3 are removed and, thus, the first circuit 401 is directly connected via resonant circuits 405, 406, 407 to the second circuit 408. Thus, the sub-circuits 409, 410 and 411 of the second circuit 408 comprise only two diodes D1 and D2 that are connected in series. The inductors L1, L2 and L3 of the resonant circuits 405, 406 and 407 are connected to the connection point between the two diodes of the sub-circuit 409, 410 and 411, respectively.

The second circuit 408 functions like the circuit 308 of the operating device 1 of the second embodiment as a rectifier, wherein the capacitors C2, C4 and C6 provide DC blocking, i.e. the voltage drop between the connection point between diodes D1 and D2 and the node "Supply-", the voltage drop between the connection point between the diodes D3 and D4 and the node "Supply-" and the voltage drop between the connection point between the diodes D5 and D6 and the node "Supply-" are equal, as the capacitors C2, C4 and C6 remove the voltage offset. Thus the capacitors C2, C4 and C6 avoid the use of transformers. Therefore, the output voltages of the half bridge converters 402, 403 and 404 are rectified and the capacitor C7 is charged with energy.

The operating device 1 according to the third embodiment has the advantage that less electronic elements are needed then in the operating device 1 according to the second embodiment and, thus, the manufacturing costs are lower and the profile of the operating device can be made lower. In the case a galvanic isolation is required a transformer could be provided in a next converter stage U1 after the capacitor C7. Furthermore, the topology of FIG. 4 has the advantage of a negligible surge current when switching the switches of the half bridge converters 402, 403 and 404, as only high frequency decoupling capacitors C1, C3 and C5 are charged.

Figure 5:
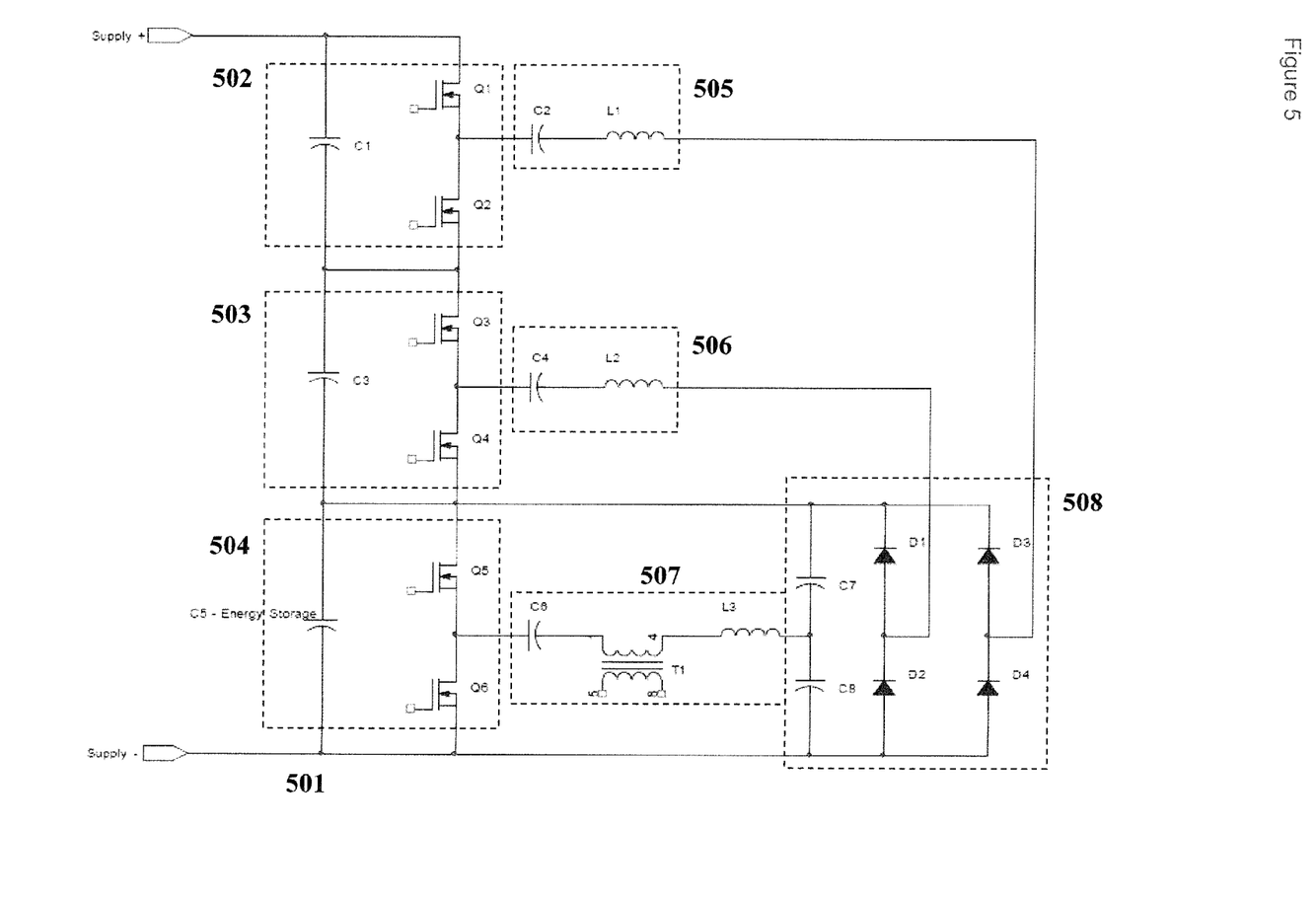
FIG. 5 shows an operating device for lighting means according to a fourth embodiment of the invention.

FIG. 5 shows an operating device 1 for lighting means 8 according to a fourth embodiment of the invention. In the following only differences with respect to the operating device 1 according to the third embodiment are described.

In detail, the two half bridge converters 502 and 503 each supply an alternating output voltage via the resonant circuits 505 and 506, respectively, to the second circuit 508. The second circuit 508 corresponds to the second circuit 408 of the third embodiment, wherein the capacitor C7 is replaced by two capacitors C7 and C8 that are connected in series. Thus, the second circuit 508 corresponds to a voltage doubler circuit.

The capacitor C5 of the half bridge converter 504 now also functions as an energy storage. The output of the half bridge converter 504 (the connection point between the switches Q5 and Q6) is connected via a capacitor C6 to one end of the primary side of a transformer T1. The connection point between the two capacitors C7 and C8 of the voltage doubling circuit 508 (second circuit 508) is connected via an inductor L3 to the other end of the primary side of the transformer T1. The transformer T1 is provided in order to galvanically isolate the load from the circuit. Preferably, the power provided by the operating device 1 according to the present invention may be isolated by a switched transformer to provide controllable power to a load.

In detail, the energy stored on the capacitor C5 is supplied from two sources. Namely, the first current component charging the capacitor C5 is the current flowing through the half bridge converters 502 and 503. This current represents one third of the current flowing to the energy storage capacitor C5. The remaining two thirds of the current flowing to the capacitor C5 and, thus, charging it, comes from the diodes D1, D2, D3 and D4 of the voltage doubling circuit 508. Preferably, the capacitor C5 will be charged by the half bridge converters 502 and 503 via the voltage double circuit 508 in case the voltage swing at the input to the voltage doubler circuit 508, i.e. at the connection point between the diodes D1 and D2 and at the connection point between the diode D3 and D4, is at least equal to the voltage across the capacitor C5. At the same time the voltage drop across each of the half bridge converters corresponds to the value of the smoothed rectified alternating input voltage of circuit 501 being divided by the number of half bridge converters of the half bridge converter chain.

The load is provided with power from the energy storage C5. Preferably, the load is always provided with power from across the capacitor C5. When an isolated power supply is desired, then a transformer T1 can be provided, as shown in FIG. 5. The power is then provided on the secondary side of the transistor T1 (terminals 5 and 8). That is, the transformer T1 is provided if isolation is required.

The implementation of the operating device 1 according to the fourth embodiment has the advantage that the losses from one half bridge converter of the three in series connected half bridge converters have been completely removed improving efficiency. Furthermore, fever electronic components are used, as a complete half bridge converter section has been removed.

Figure 6:
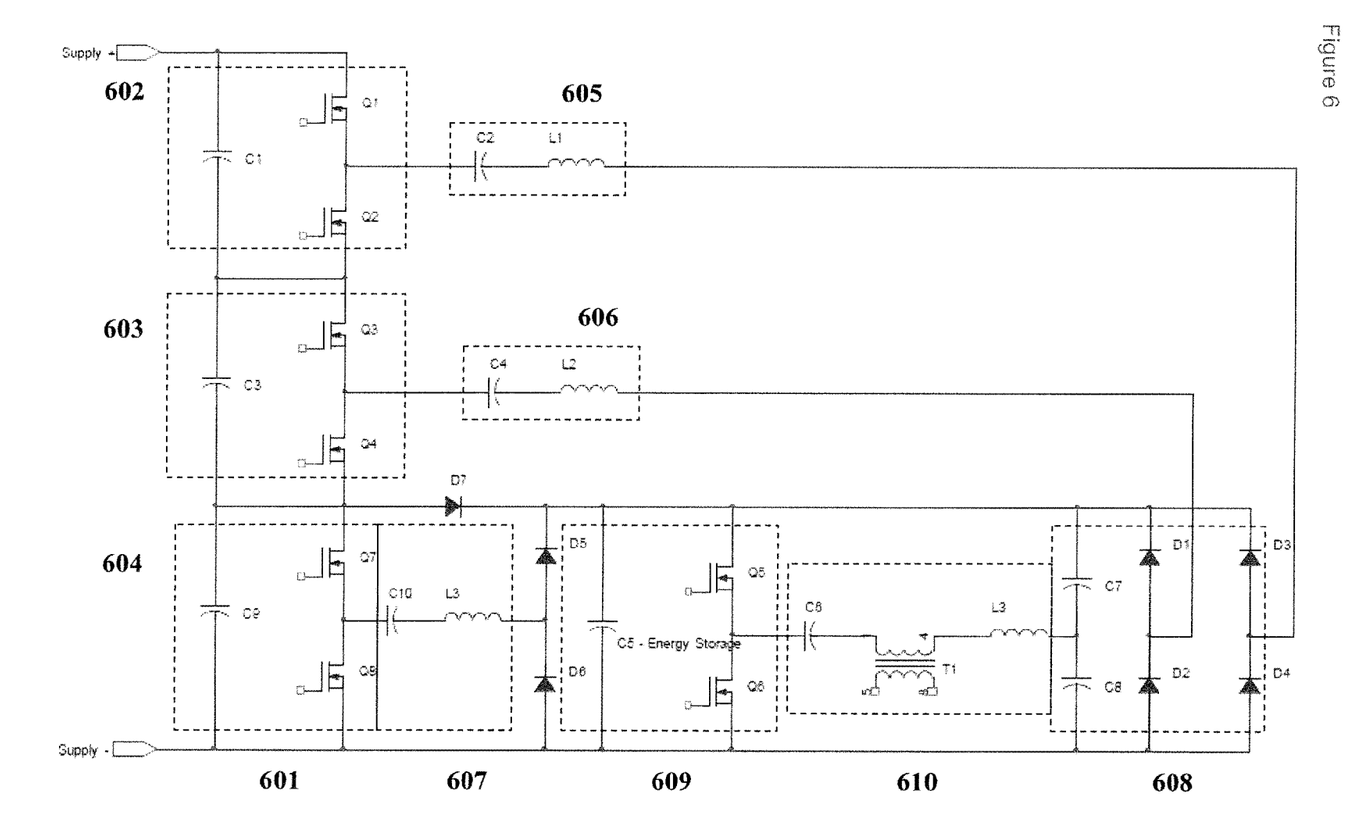
FIG. 6 shows an operating device for lighting means according to a fifth embodiment of the invention.

FIG. 6 shows an operating device 1 for lighting means 8 according to a fifth embodiment of the invention. In the following only differences with respect to the operating device 1 according to the fourth embodiment are described. The half bridge converter 609, which comprises the energy storage capacitor C5 and corresponds to the half bridge converter 504 of the fourth embodiment, is now rearranged with respect to the operating device 1 according to the fourth embodiment. Namely, the half bridge converter 609 is not a part of the chain of half bridge converters of the first circuit 601. Now, the energy storage capacitor C5 is supplied with energy from the half bridge converter 604, which is a part of the chain of half bridge converters of the first circuit 601, via a resonant circuit 607 and a rectifier consisting of the two diodes D5 and D6, which are connected in series. The half bridge converter 609 is electrically decoupled from the half bridge converter 604 via the diode D7.

Decoupling the half bridge converter 609 from the half bridge converter 604 via the diode D7 has the advantage that the energy storage capacitor C5 is always charged with energy provided by the circuit 608.

Figure 7:
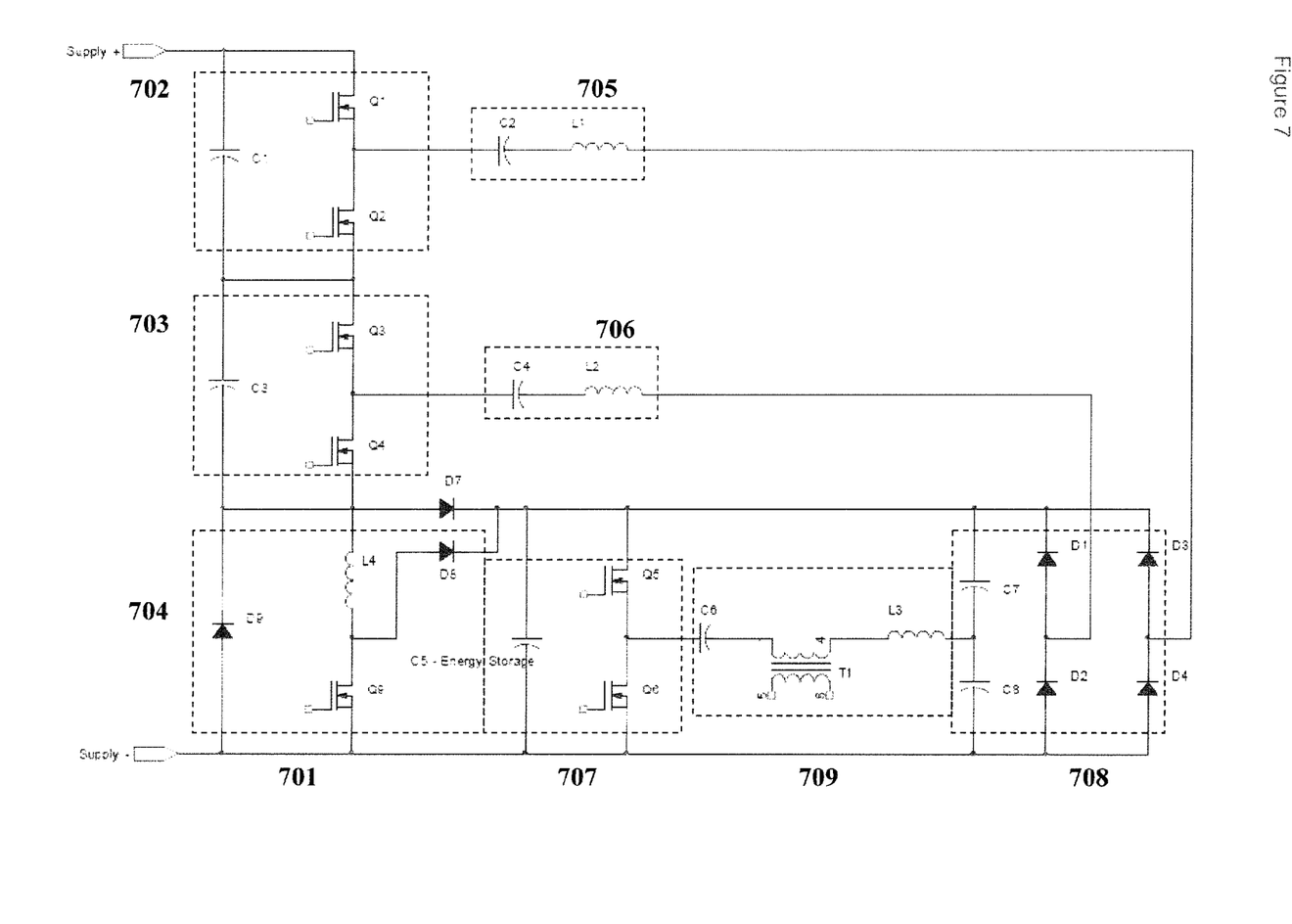
FIG. 7 shows an operating device for lighting means according to a sixth embodiment of the invention.

FIG. 7 shows an operating device 1 for lighting means 8 according to a sixth embodiment of the invention. In the following only differences with respect to the operating device 1 according to the fifth embodiment are described. In the sixth embodiment, the half bridge converter 604, the resonant circuit 607 and the rectifier consisting of the diodes D5 and D6 are replaced by the circuit 704. The circuit 704 consists of a diode D9 that is connected in parallel to an inductor L4 and a switch Q9, wherein the inductor L4 and the switch Q9 are connected in series. The inductor L4 is provided so as to facilitate lossless switching of the switch Q9. A diode D8 connects the energy storage capacitor C5 to the connection point between the inductor L4 and the switch Q9 of the circuit 704. Preferably, if the switch Q9 is closed, i.e. is switched on, the inductor L2 charges capacitors C1 and C3, but does not charge the capacitor C5. Note that the diodes D7 and D8 become reverse biased when the switch Q9 is closed.

Figure 8:
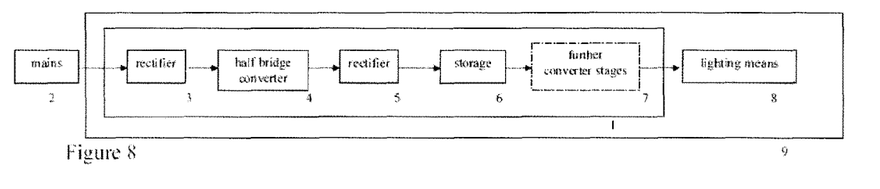
FIG. 8 shows a basic block diagram of the operating device according to the present invention.

FIG. 8 shows a schematic block diagram of the operating device 1 for lighting means 8 according to the present invention. In this block diagram it is assumed that mains voltage 2 is used as the high input voltage. However, any other high voltage can be input to the operating device 1. The operating device 1 may comprise a rectifier 3 for rectifying the alternating input voltage. Next a converter 4 is being provided, which corresponds to the first circuit 101 comprising the chain of half bridge converters, as shown in FIG. 1. The rectifier 5 and storage 6 correspond to the second circuit of the above embodiments. Further converter stages 7 can also be provided in the operating device 1. The operating device 1 according to the present invention can be provided together with the lighting means 8 in the lighting device 9.

The invention claimed is:

1. An operating device for lighting means, having a circuit for dividing a rectified alternating voltage to direct voltages of lower levels, wherein the circuit comprises a PFC block comprising a plurality of half bridge converters that are arranged such that the sum of the input voltage drops across the half bridge converters corresponds to the value of the rectified alternating voltage, wherein the circuit is the first active stage in a power supply for the lighting means (8) and further wherein the circuit for dividing the rectified alternating voltage to direct voltages of lower levels is a first circuit and the operating device further comprises a second circuit being supplied by the output of the first circuit for rectifying the output voltage of each half bridge converter and a plurality of resonant circuits;

wherein each half bridge converter of the first circuit is connected via one of the plurality of resonant circuits to the second circuit.

2. The operating device according to claim 1, wherein each half bridge converter comprises a capacitor that is connected in parallel to the half bridge of the corresponding half bridge converter.

3. The operating device according to claim 1, further comprising a plurality of transformers for galvanically isolating the first circuit from the second circuit.

4. The operating device according to claim 1, wherein each of the half bride converters is operated with a frequency laying within 20% of the resonance frequency of the corresponding resonant circuit.

5. The operating device according to claim 1, wherein each of the half bridge converters is operated with a fixed frequency.

6. The operating device according claim 1, wherein each of the half bridge converters is operated with the same frequency.

7. A lighting device comprising the operating device according to claim 1 and lighting means, wherein the lighting means are supplied by the operating device with energy.

8. The PFC block for the operating device according to claim 1, comprising a plurality of half bridge converters that are arranged such that the sum of the input voltage drops across the half bridge converters corresponds to the value of the rectified alternating voltage.

* * * * *